UNITED STATES PATENT OFFICE.

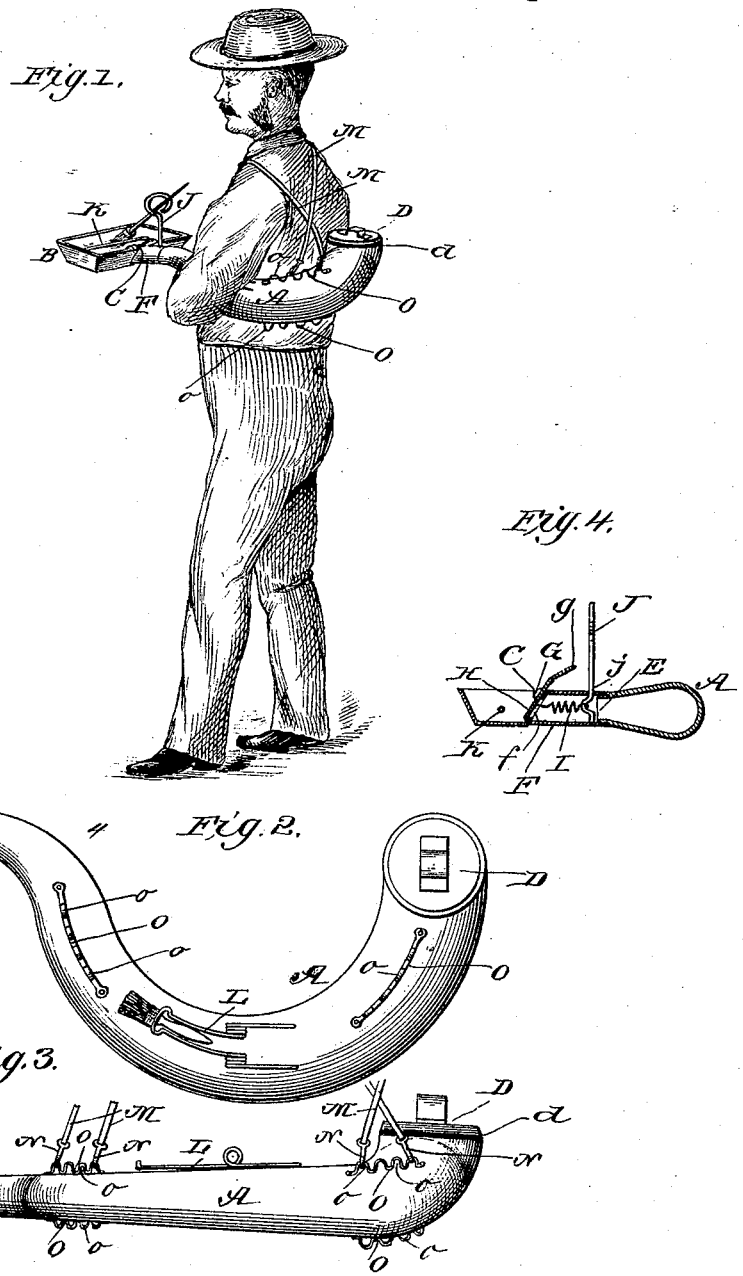

WILLIAM C. SHAW, OF WHITE PLAINS, MARYLAND, ASSIGNOR OF TWO-THIRDS TO REBECCA W. HAWKINS, OF SAME PLACE, ARTHUR HAWKINS, OF LA PLATA, AND FRANCIS W. MATTHEWS, OF ALLEN'S FRESH, MARYLAND.

FOUNTAIN PAINT-CARRIER.

SPECIFICATION forming part of Letters Patent No. 437,519, dated September 30, 1890.

Application filed June 16, 1890. Serial No. 355,679. (No model.)

*To all whom it may concern:*

Be it known that I, WILLIAM C. SHAW, residing at White Plains, Charles county, and State of Maryland, have invented a new and Improved Fountain Paint-Carrier, of which the following is a specification.

My invention is a fountain paint-carrier; and it consists in certain novel constructions and combinations of parts, as will be hereinafter described and claimed.

In the drawings, Figure 1 shows the carrier as in use. Fig. 2 is a top plan view, and Fig. 3 is a side view, thereof. Fig. 4 is a sectional view on about line 4 4 of Fig. 2, and Fig. 5 is a detail view showing the manner of securing the valve in the dip-cup.

The carrier comprises the fountain or reservoir A, the dip pan or cup B, and the valve C, which controls the passage of paint from the reservoir to the pan. The reservoir is curved longitudinally, so that it may fit the side of the painter, and is preferably curved in cross-section to render it comfortable when it is fitted close up under the painter's arm, and also to facilitate the cleansing of the fountain; but it will be understood that the said fountain may be of rectangular or other desired shape, instead of the preferred form shown, without departing from some of the broad features of my invention.

In the construction shown the fountain is slightly bent up at one end, and has at such end a removable cap D, and, if desired, a rubber gasket $d$, and it is tapered or gradually reduced in size toward its opposite end, which is threaded and forms a nipple E, as shown.

The dip pan or cup B is connected with the fountain A to receive the paint therefrom. To this end, the pan or cup is provided with a tube F, which threads on the nipple E, so that the dip-pan may be readily applied to and removed from the fountain or reservoir.

Above the inlet-opening $f$ from the tube F into the pan I provide overhanging lugs or bearings G under which the upper edge of the valve-plate H bears and pivots. The valve has the handle $g$ extended from the upper edge of its plate, by which handle it may be opened, and is held normally closed by the spring I, preferably arranged, as shown, with one end secured to the inner side of plate H, and its opposite end extended through the opening $f$ into the tube F, and secured, preferably, to the part presently described.

The brush-handle support or holder J may or may not be used, as desired. It is preferred, however, to use this holder and to support it in connection with the dip pan or cup preferably by extending its shank-rod $j$ through the tube F, as shown. The portion of the shank $j$ within the tube F forms a convenient construction to which the inner end of the valve-actuating spring I may be fastened. The supporting of the rod J in rigid connection with the pan or cup insures the proper arrangement of said rod when the pan or cup is given a half-turn on the nipple of the fountain, as will be referred to hereinafter.

In the pan I provide a brush-wiping wire or rod K.

A brush-clamp L is provided on the fountain or reservoir, enabling the painter to conveniently carry one or more extra brushes.

In securing the device to the person of the painter it is preferred to employ straps M to go over one or both shoulders and serving to secure the fountain snugly up under the arm of the painter. At one or both ends these straps M are provided with snap-hooks N, to render easy the application of the straps to and their removal from the shoulders. The strap or straps connect with the bails or loops O O, which are arranged near the opposite ends of the fountain for engagement by the front and rear ends of the straps. I make these bails or loops each with a number of seats $o$, so that the front and rear ends of the straps may be adjusted to the proper seat of their respective bails to secure the proper balancing of the fountain or reservoir. It may be preferred to provide these bails or loops O on diametrically-opposite sides of the fountain or reservoir, so that the device may be supported at either the right or left side of the painter; but manifestly the carriers may be made rights or lefts, if so desired. When the same carrier is used for right or left, it will be seen that a half-turn of the dip pan or cup will adjust the same to proper position for use. By opening the valve a small quantity of paint can be admitted to the dip-pan, as desired, which operation may be repeated as the paint in the pan is used up.

The device will be found especially useful in painting on ladders, painting ships' masts, and the like, where it is inconvenient to carry open buckets of paint.

Having thus described my invention, what I claim, and desire to secure by Letters Patent, is—

1. An improved fountain paint-carrier, substantially as described, comprising the fountain or reservoir conformed to and adapted to be worn upon the body of the user, and the dip pan or cup connected with and adapted to receive paint from the fountain or reservoir, such dip pan or cup being open and unobstructed at its upper end, whereby a brush may be freely dipped into and removed therefrom, all substantially as and for the purposes set forth.

2. A fountain paint-carrier comprising the fountain or reservoir, the dip pan or cup connected with the said fountain or reservoir, whereby to receive paint therefrom and detachable, as described, and a valve by which to control the passage of paint to the dip pan or cup, all substantially as and for the purposes set forth.

3. The fountain paint-carrier herein described, comprising the fountain or reservoir having a threaded nipple, the dip pan or cup having a threaded tube to fit on said nipple, and a valve by which to control the passage of paint to the dip pan or cup, substantially as set forth.

4. The fountain paint-carrier herein described, consisting of the fountain or reservoir curved longitudinally, whereby it is adapted to fit the side of the painter's body, the dip pan or cup connected with said fountain, and a valve controlling the passage of the paint from the fountain to the dip pan or cup, all substantially as set forth.

5. A fountain paint-carrier, substantially as described, comprising a fountain or reservoir provided near its opposite ends with bails or loops to facilitate the connection of the shoulder-straps and having such bails or loops provided with a plurality of seats to permit the adjustment of the shoulder-straps, and the dip pan or cup connected with the fountain or reservoir, substantially as herein described, and for the purposes set forth.

6. A fountain paint-carrier consisting of the fountain or reservoir, a brush-holder or clamp supported thereby, a dip pan or cup connected with such reservoir, and the valve by which to control the passage of paint from the reservoir to the dip pan or cup, substantially as set forth.

7. A fountain paint-carrier consisting of the fountain or reservoir having the threaded nipple, the dip pan or cup having a connecting-tube formed to turn on the threaded nipple, a valve fitting the opening of said tube into the pan, and the actuating-spring secured to the valve and extended into and made fast within the connecting-tube, substantially as set forth.

8. In a fountain paint-carrier, the combination of the fountain or reservoir, the dip pan or cup connected with the fountain or reservoir, a valve for controlling the passage of paint from the fountain to the dip-pan, and the brush-handle support mounted on the dip pan or cup, all substantially as and for the purposes set forth.

9. The combination of the dip pan or cup having the feed-opening and provided above the said opening with overhanging lugs or portions, the valve-plate fitting and pivoting at its upper edge under said lugs or bearings, and the spring for actuating said plate, all substantially as set forth.

10. The combination of the dip-pan having the connecting-tube, the valve controlling the inlet-opening to said pan, the brush-handle holder having its shank extended across the connecting-tube, and the spring connected at one end with the valve and extended into the tube and connected at its other end with the shank of the brush-handle support, all substantially as set forth.

11. The improved fountain paint-carrier herein described, consisting of the fountain or reservoir, rounded in cross-section and curved longitudinally to fit the body of the painter, the dip pan or cup connected with the fountain or reservoir, and the valve by which to control the passage of the paint from the fountain to the dip-pan, substantially as set forth.

12. An improved fountain paint-carrier comprising the fountain or reservoir adapted to be worn upon the body of the wearer, the strap or straps by which to secure such fountain or reservoir to the body, and the dip pan or cup connected with the fountain or reservoir, all substantially as and for the purposes set forth.

WILLIAM C. SHAW.

Witnesses:
P. W. HAWKINS,
L. M. SOUTHERLAND.